(12) United States Patent
Li et al.

(10) Patent No.: US 10,294,951 B2
(45) Date of Patent: May 21, 2019

(54) SHAFT SLEEVE HAVING A BEARING AND A RESILIENT MEMBER FORMED WITH PROTRUSIONS AND GROOVES

(71) Applicant: JOHNSON ELECTRIC INTERNATIONAL AG, Murten (CH)

(72) Inventors: Min Li, Shenzhen (CN); Zhi Ping Fu, Shen Zhen (CN); Moola Mallikarjuna Reddy, Shen Zhen (CN); Kok Ang Chong, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 194 days.

(21) Appl. No.: 15/251,268

(22) Filed: Aug. 30, 2016

(65) Prior Publication Data
US 2017/0058908 A1    Mar. 2, 2017

(30) Foreign Application Priority Data
Aug. 31, 2015   (CN) .......................... 2015 1 0548296

(51) Int. Cl.
| | | |
|---|---|---|
| *F04D 29/046* | (2006.01) | |
| *F04D 13/06* | (2006.01) | |
| *F04D 29/056* | (2006.01) | |
| *F04D 29/60* | (2006.01) | |
| *H02K 7/08* | (2006.01) | |
| *F16C 27/02* | (2006.01) | |
| *F16C 27/06* | (2006.01) | |
| *F04D 29/047* | (2006.01) | |
| *F04D 29/66* | (2006.01) | |

(52) U.S. Cl.
CPC ..... *F04D 29/0462* (2013.01); *F04D 13/0626* (2013.01); *F04D 13/0633* (2013.01); *F04D 29/0563* (2013.01); *F04D 29/605* (2013.01); *F16C 27/02* (2013.01); *F16C 27/063* (2013.01); *H02K 7/08* (2013.01); *F04D 29/047* (2013.01); *F04D 29/669* (2013.01)

(58) Field of Classification Search
CPC ............... F04D 29/046; F04D 13/0606; F04D 13/0626; F04D 13/0633; F04D 29/04; F04D 29/0462; F04D 29/056; F04D 29/0563
See application file for complete search history.

(56) References Cited

U.S. PATENT DOCUMENTS

| | | | | |
|---|---|---|---|---|
| 3,576,380 A | * | 4/1971 | Sargeant | ................. B60S 1/481 415/172.1 |
| 2006/0098908 A1 | * | 5/2006 | Clarke | ................. F16C 11/0614 384/192 |

(Continued)

FOREIGN PATENT DOCUMENTS

| | | |
|---|---|---|
| EP | 2017479 A2 | 1/2009 |
| EP | 2620650 A1 | 7/2013 |

*Primary Examiner* — Bryan Lettman
*Assistant Examiner* — Timothy P Solak
(74) *Attorney, Agent, or Firm* — Muncy, Geissler, Olds & Lowe, P.C.

(57) ABSTRACT

A liquid pump includes a motor and an impeller. The motor includes a stator, a rotor, a base body and a shaft sleeve unit supporting the rotor for rotation. The shaft sleeve unit includes a fixing member fixed in the base body, a bearing received in the fixing member and surrounding the rotary shaft, and a resilient buffering member disposed between the fixing member and the bearing. The impeller is coupled to the rotor.

16 Claims, 8 Drawing Sheets

(56) References Cited

U.S. PATENT DOCUMENTS

2009/0202372 A1* 8/2009 Marioni ................. H02K 5/128
              417/423.11
2011/0027112 A1* 2/2011 Negishi .................... F01P 5/12
              417/423.7

* cited by examiner

SHAFT SLEEVE HAVING A BEARING AND A RESILIENT MEMBER FORMED WITH PROTRUSIONS AND GROOVES

CROSS REFERENCE TO RELATED APPLICATIONS

This non-provisional patent application claims priority under 35 U.S.C. § 119(a) from Patent Application No. 201510548296.5 filed in The People's Republic of China on 31 Aug. 2015.

FIELD OF THE INVENTION

The present disclosure relates to liquid pumps.

BACKGROUND OF THE INVENTION

In home appliances such as washing machines or dish washers, liquid pumps are used to pressurize and deliver water so as to introduce clean water into the appliances for cleaning the clothes or dishes in the appliances, and finally discharge the wash water out of the appliances.

In liquid pumps, an effective support to the rotary shaft of the motor is needed to ensure coaxiality of the rotor, maintain smooth operation of the rotor and reduce the noise.

SUMMARY OF THE INVENTION

Thus, there is a desire for a shaft sleeve unit for supporting the rotary shaft and provides a motor and a liquid pump using the shaft sleeve unit, which is capable of smoother operation and has reduced noise.

In one aspect, a shaft sleeve unit is provided which includes a fixing member, a bearing received in the fixing member, and a resilient buffering member disposed between the fixing member and the bearing. A first groove-protrusion structure is formed between a radial inner surface of the fixing member and a radial outer surface of the resilient buffering member, and a second groove-protrusion structure is formed between a radial outer surface of the bearing and a radial inner surface of the resilient buffering member. A radial thickness of the resilient buffering member between the first groove-protrusion structure and the second groove-protrusion structure is not greater than a radial distance between the radial outer surface of the bearing and the radial inner surface of the fixing member.

In another aspect, a motor is provided which includes a stator, a rotor, a base body, and a shaft sleeve unit received in the base body and supporting the rotor for rotation. The rotor comprises a rotary shaft. The rotary shaft has an output end extending out of the base body. The shaft sleeve unit comprises a fixing member fixed in the base body. A bearing is received in the fixing member and surrounds the rotary shaft. A resilient buffering member is disposed between the fixing member and the bearing.

In still another aspect, a liquid pump is provided which includes a motor and an impeller driven by the motor. The motor includes a stator, a rotor, a base body, and a shaft sleeve unit received in the base body and supporting the rotor for rotation. The rotor comprises a rotary shaft. The rotary shaft has an output end extending out of the base body. The impeller is coupled to the output end of the rotor. The shaft sleeve unit comprises a fixing member fixed in the base body, a bearing received in the fixing member and surrounding the rotary shaft, and a resilient buffering member disposed between the fixing member and the bearing.

The liquid pump of the present disclosure includes the shaft sleeve unit disposed at the output end of the rotary shaft to support the rotary shaft, which ensures the coaxiality between the rotor and the stator. In addition, the shaft sleeve unit includes the buffering member to absorb the vibrations of the rotor, thus preventing the vibrations of the rotor from being transmitted outwards and reducing the noise.

DETAILED DESCRIPTION OF THE PREFERRED EMBODIMENTS

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

Figure 1:
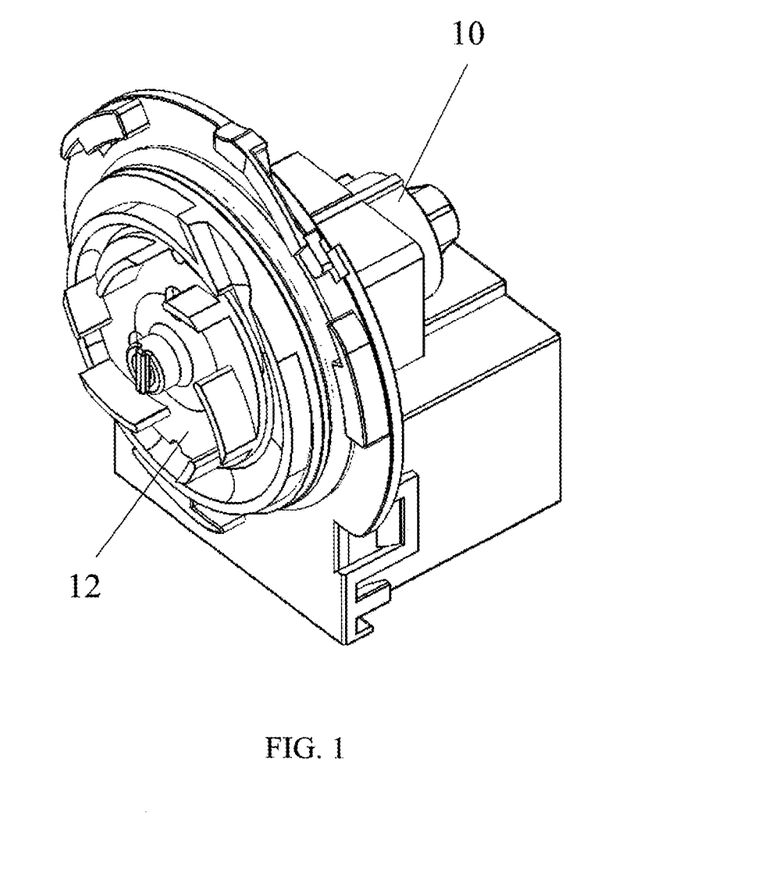
FIG. 1 illustrates a liquid pump according to one embodiment of the present disclosure.
Figure 2:
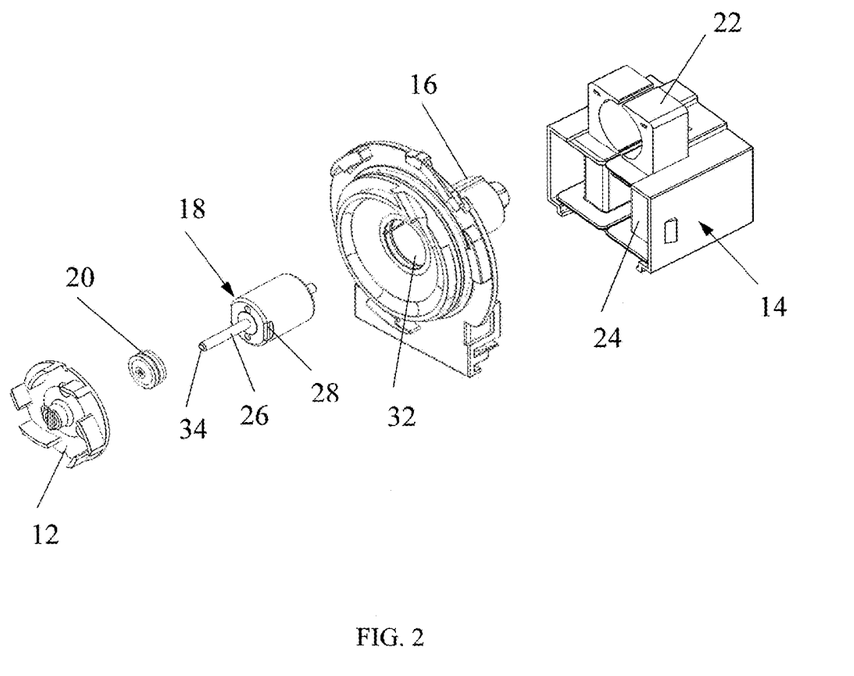
FIG. 2 is an exploded view of FIG. 1.

Referring to FIG. 1 to FIG. 2, a liquid pump in accordance with one embodiment of the present disclosure includes a motor 10 and an impeller 12 driven by the motor 10.

The motor 10 is preferably a single phase permanent magnet motor which includes a stator 14, a base body 16 inserted into the stator 14, a rotor 18 received in the base body 16, and a shaft sleeve unit 20 for supporting the rotor 18 for rotation. Preferably, the stator 14 is formed by a U-shaped magnetic core 22 and windings 24 wound around the magnetic core 22. The magnetic core 22 forms a pair of magnetic poles. The rotor 18 is a permanent magnet rotor and includes a rotary shaft 26 and a pair of permanent magnets 28 fixed to the rotary shaft 26. The base body 16 is a cylindrical structure having an open end and a closed end. The base body 16 is inserted between the pair of magnetic poles of the stator 14, with the open end facing toward the impeller 12. One end of the rotor 18 is rotatably received in the closed end of the base body 16, and the other end is an output end 34 which passes through the open end 32 of the base body 16 to connect with the impeller 12. The shaft sleeve unit 20 is received in the base body 16 and disposed at the open end 32 of the base body 16 for supporting the output end 34 of the rotary shaft 26 to maintain stable rotation of the rotor 18.

Figure 3:
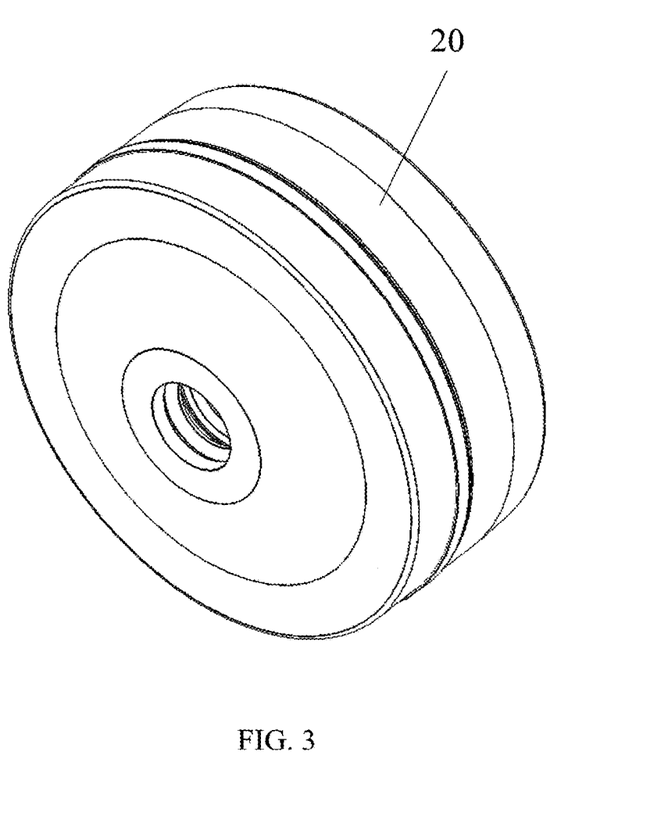
FIG. 3 is an enlarged view of a shaft sleeve unit of the motor of the liquid pump of FIG. 2.
Figure 4:
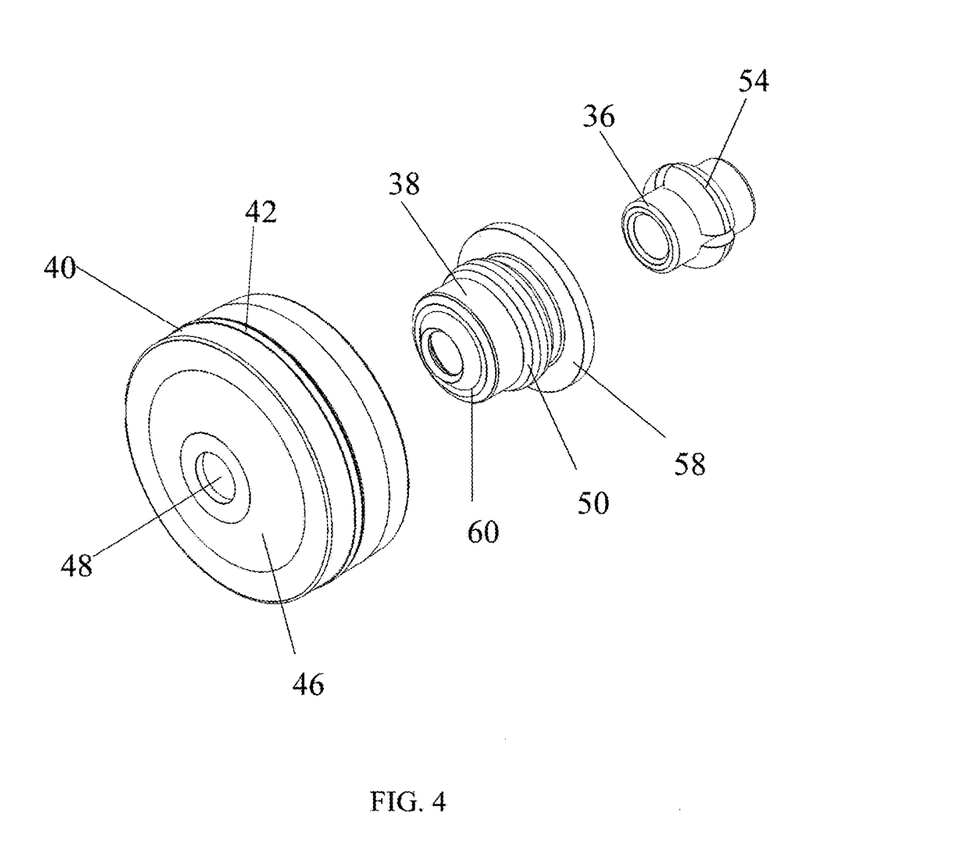
FIG. 4 is an exploded view of the shaft sleeve unit of FIG. 3.
Figure 5:
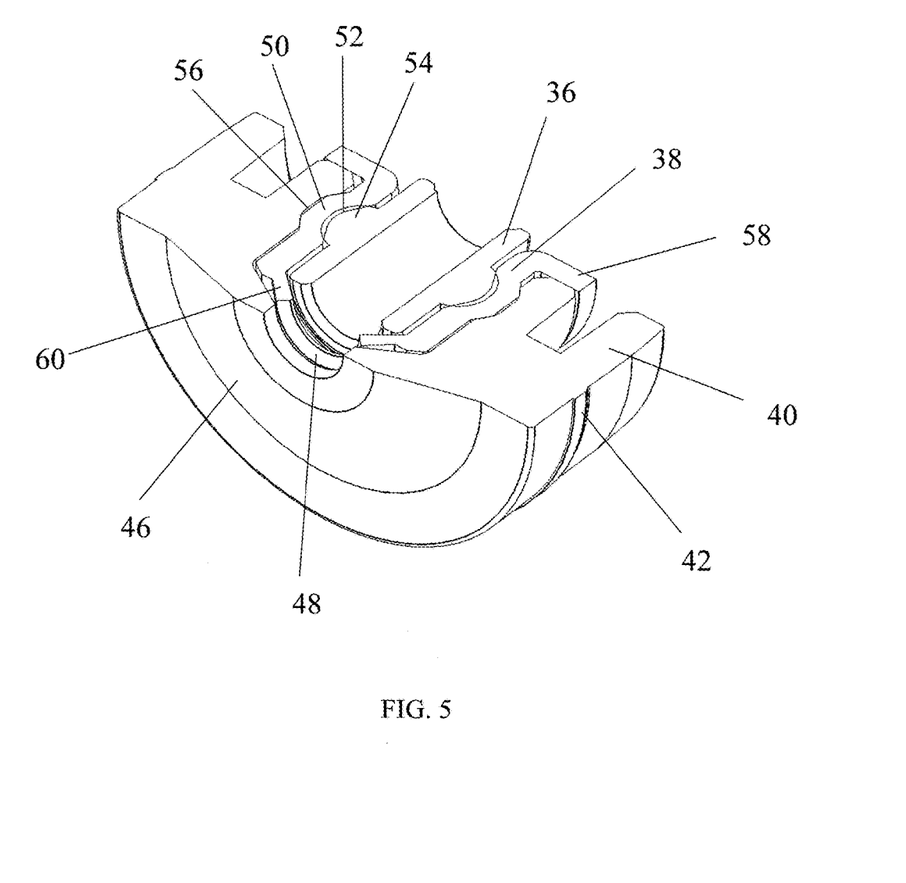
FIG. 5 is a sectional view of the shaft sleeve unit of FIG. 3.

Referring also to FIG. 3 to FIG. 5, the shaft sleeve unit 20 includes a bearing 36, a buffering member 38 and a fixing member 40 that are sleeved around one another.

Figure 6:
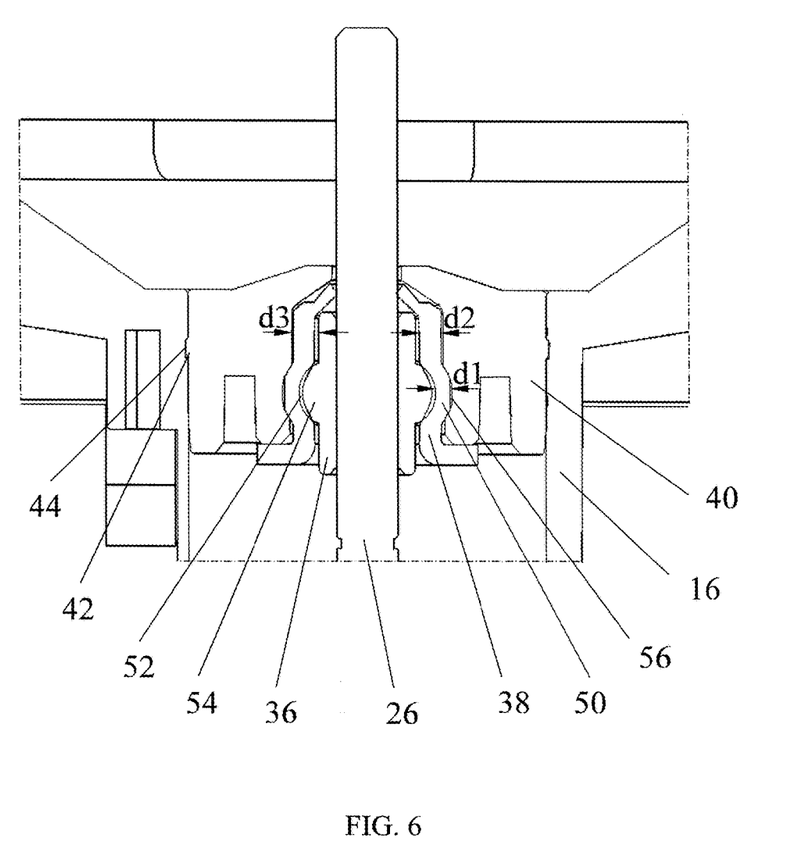
FIG. 6 is a sectional, assembled view of the shaft sleeve unit, the rotor of the motor and the base body.

The fixing member 40 is disposed at the open end 32 of the base body 16 to mount the entire shaft sleeve unit 20 in the base body 16. The fixing member 40 overall is a hollow cylindrical structure which has an outer diameter substantially equal to an inner diameter of the base body 16. Referring also to FIG. 6, in this embodiment, an outer surface of the fixing member 40 is formed with a protrusion 42, an inner surface of the base body 16 is formed with an engagement slot 44 corresponding to the protrusion 42, and, in assembly, the protrusion 42 is engaged in the engagement slot 44 to fix the shaft sleeve unit 20 in the base body 16. It should be understood that the fixing member 40 may be formed with the engagement slot 44, the base body 16 may be formed with the protrusion 42 and, likewise, the shaft sleeve unit 20 can be fixed by the engagement between the engagement slot 44 and the protrusion 42.

One side of the fixing member 40 facing the open end 32 of the base body 16, i.e. facing the impeller 12, is formed with an end plate 46. The end plate 46 substantially closes the open end 32 of the base body 16. The end plate 46 is formed with a central through bore 48. The output end 34 of the rotary shaft 26 is connected to the impeller 12 after passing through the through bore 48. One end of the fixing member 40 facing toward an inner side of the base body 16 is open, and the buffering member 38 and bearing 36 are mounted in the fixed member 40 via the open end of the fixing member 40. The bearing 36 may be a ball bearing, a sleeve bearing, or a ceramic bearing for supporting the rotary shaft 26 for rotation. The material of the bearing 36 may be one with a certain hardness and wear resistance such as PPS, PTEF, or the like. The buffer member 38 may be formed from a rubber material which has a certain resiliency. In assembly, the buffering member 38 is first sleeve around the bearing 36, and the assembled buffering member 38 and the bearing 36 are together inserted into the fixing member 40.

In this embodiment, the buffering member 38 is connected to the fixing member 40 and the bearing 36 both by interference-fit. In assembly, the buffering member 38 deforms to effectively compensate for the tolerances of the bearing 36 and the fixing member 40, thus ensuring the coaxiality of the entire shaft sleeve unit 20. Therefore, even if the precision of the bearing 36 and fixing member 40 is not high enough, the coaxiality of the entire shaft sleeve unit 20 can still be ensured by the buffering member 38. Preferably, the buffering member 38 is snap-fit with the bearing 36 and the fixing member 40 to limit axial positions of these components.

Specifically, a radial outer surface of the buffer member 38 projects outwardly to form an annular protrusion 50, and a radial inner surface is recessed inwardly to form an annular groove 52. Preferably, the annular protrusion 50 and annular groove 52 of the buffering member 38 correspond to each other in position, such that the buffering member 38 has an enough thickness to provide an enough space for deformation at the area of the annular groove 52. Preferably, a radial thickness dl of the buffering member 38 i.e. a radial spacing between the outer surface and the inner surface, at the area of the annular protrusion 50/annular groove 52, is slightly less than a radial thickness d2 of the buffering member 50 at the remaining area, i.e. d1<d2. Correspondingly, a radial outer surface of the bearing 36 projects outwardly to form an annular protrusion 54, and a radial inner surface of the fixing member 40 is recessed inwardly to form an annular groove 56.

In assembly, the annular protrusion 54 of the bearing 36 is engaged in the annular groove 52 of the buffering member 38 to fixedly connect the bearing 36 with the buffering member 38, such that one groove-protrusion structure is formed between the inner surface of the buffering member 38 and the outer surface of the bearing 36. The assembled bearing 36 and the buffering member 38 is then inserted into the fixing member 40 via the open end of the fixing member 40, with the annular protrusion 50 of the buffering member 38 engaged in the annular groove 56 of the fixing member 40, such that another groove-protrusion structure is formed between the outer surface of the buffering member 38 and the inner surface of the fixing member 40. Thus, the entire shaft sleeve unit 20 are assembled together. The radial thickness d1 of the buffering member 38 at the area of the annular protrusion 50/annular groove 52, i.e. a radial thickness between the first groove-protrusion structure and the second groove-protrusion structure, is not greater than a radial distance d3 between the outer surface of the bearing 38 and the inner surface of the fixing member 40, i.e. d1≤d3.

Preferably, one end of the buffering member 38 projects radially outwardly to form a flange 58, and the other end projects radially inwardly to form a stop ring 60. An inner diameter of the stop ring 60 is substantially equal to an outer diameter of the rotary shaft 26, i.e. not less than the outer diameter of the bearing 36. The stop ring 60 extends obliquely, which has a thickness less than the radial thickness of the remaining portion (mainly the portion between the bearing 36 and the fixing member 40 in this embodiment) of the buffering member 38. After assembled with the rotary shaft 26, the stop ring 60 closely contacts the outer wall surface of the rotary shaft 26, preventing dusts from entering the shaft sleeve unit 20. In engaging the bearing 36 into the buffering member 38, the bearing 36 is inserted into the buffering member 38 via the end of the buffering member 38 that forms the flange 58 until contacting the stop ring 60. The stop ring 60 positions the bearing 36 to prevent the bearing 36 from passing through the buffering member 38. In engaging the buffering member 38 and the bearing 36 into the fixing member 40, the end of the buffering member 38 that forms the stop ring 60 is inserted in the fixing member 40 via the open end until the flange 58 of the buffering member 38 contacts the fixing member 40. This ensures that the annular protrusion 50 of the buffering member 38 is engaged in the annular groove 56 of the fixing member 40, thus forming the shaft sleeve unit 20.

In assembly with the rotor 18, the rotor 18 is firstly inserted into the base body 16, with the output end 34 of the rotary shaft 26 of the rotor 18 extending out of the open end 32 of the base body 16. The assembled shaft sleeve unit 20 is sleeved around the rotary shaft 26, and is pushed into the open end 32 of the base body 16 until the protrusion 42 of the fixing member 40 is engaged into the engagement slot 44 of the base body 16, whereby the shaft sleeve unit 20 is connected with the base body 16. The output end 34 of the rotary shaft 26 passes through the bearing 36, the stop ring 60 of the buffering member 38, and the end plate 46 of the fixing member 40 to connect with the impeller 12. When the motor 10 is powered on, the windings of the stator 14 are energized which interact with the magnetic field of the rotor 18 to drive the rotor 18 to rotate, which in turn rotates the impeller 12 to drive the water to flow.

During rotation of the rotor 18, because the shaft sleeve unit 20 is disposed at the output end 34 of the rotary shaft 26 to support the rotary shaft 26, which ensures that the rotary shaft 26 does not wobble, thus maintaining the coaxiality between the rotor 18 and the stator 14, making the rotation of the rotor 18 smoother, and reducing the noise. In addition, vibrations of the rotor 18 during rotation are absorbed by the buffering member 38 of the shaft sleeve unit 20 and therefore substantially no vibration is transmitted outwards, which further reduces the noise. It should be understood that, the structure of the shaft sleeve unit 20 is not intended to be limited to those described in this embodiment and can be modified according to needs.

Figure 7:
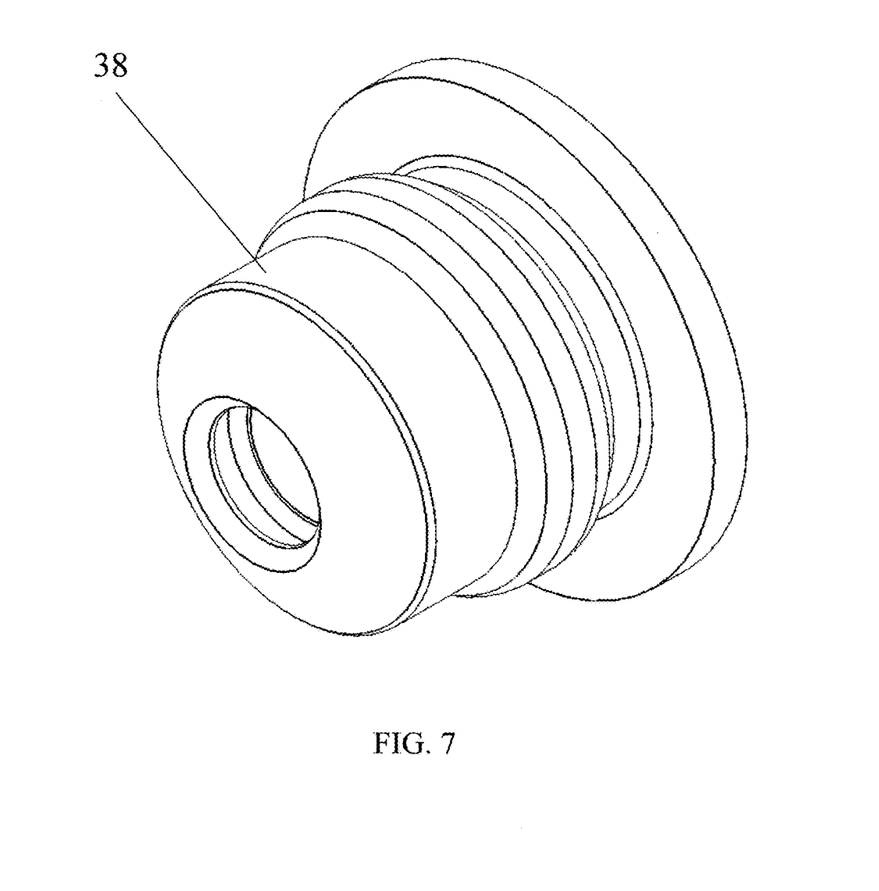
FIG. 7 illustrates the shaft sleeve unit according to another embodiment.
Figure 8:
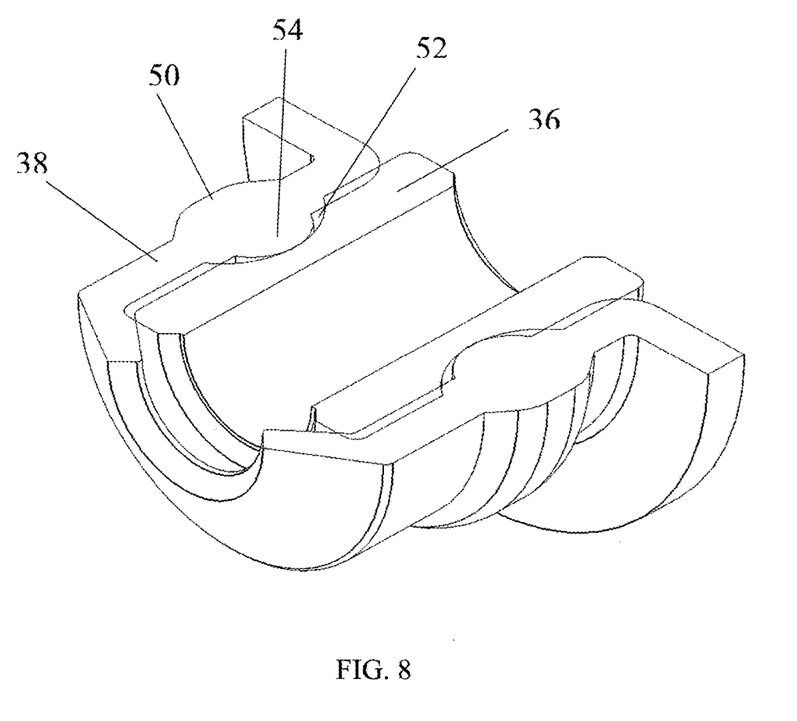
FIG. 8 is a sectional view of FIG. 7.

FIG. 7 and FIG. 8 illustrate a shaft sleeve unit 20 in accordance with another embodiment. The differences mainly include that, the radial outer surface and inner surface of the buffering member 38 are respectively formed with annular protrusions 50, 54, respectively. The bearing 36 forms a corresponding annular groove 52 in its outer surface, which engagingly receives the annular protrusion 54 on the inner surface of the buffering member 38. The annular protrusions 54, 50 of the inner and outer surfaces of the buffering member 38 illustrated in the drawings correspond to each other in position. In other embodiments, the annular protrusions 50, 54 may also be formed at different positions. In addition, if the thickness of the buffering member 38 permits, both the inner and outer surfaces of the buffering member 38 may be formed with annular grooves. In this case, the outer surface of the bearing and the inner surface of the fixing member are respectively formed with annular grooves.

Although the invention is described with reference to one or more preferred embodiments, it should be appreciated by those skilled in the art that various modifications are possible. Therefore, the scope of the invention is to be determined by reference to the claims that follow.

The invention claimed is:

1. A shaft sleeve unit comprising:
a fixing member,
a bearing received in the fixing member, and
a resilient buffering member disposed between the fixing member and the bearing;
wherein a first groove-protrusion structure is formed between a radial inner surface of the fixing member and a radial outer surface of the resilient buffering member, a second groove-protrusion structure is formed between a radial outer surface of the bearing and a radial inner surface of the resilient buffering member, a radial thickness of the resilient buffering member between the first groove-protrusion structure and the second groove-protrusion structure is not greater than a radial distance between the radial outer surface of the bearing and the radial inner surface of the fixing member;
wherein the first groove-protrusion structure comprises the radial outer surface of the buffering member recessed inwardly to form an annular groove and the radial inner surface of the fixing member projecting outwardly to form an annular protrusion, the annular protrusion of the fixing member is engaged in the annular groove of the buffering member;
wherein second groove-protrusion structure comprises the radial outer surface of the bearing projecting outwardly to form an annular protrusion and the radial inner surface of the buffering member recessed inwardly to form an annular groove, the annular protrusion of the bearing is engaged in the annular groove of the buffering member;
wherein the annular groove of the radial inner surface of the buffering member and the annular groove of the radial outer surface of the buffering member correspond to each other in position.

2. The shaft sleeve unit of claim 1, wherein one end of the resilient buffering member projects radially outwardly to form a flange, and the flange abuts against an axial end face of the fixing member.

3. The shaft sleeve unit of claim 1, wherein one end of the resilient buffering member projects radially inwardly to form a stop ring, and the strop ring is obliquely formed between the fixing member and an axial end face of the bearing.

4. The shaft sleeve unit of claim 3, wherein the stop ring has a thickness less than a thickness of the remaining portion of the resilient buffering member.

5. The shaft sleeve unit of claim 1, wherein one end of the resilient buffering member projects radially outwardly to form a flange, and the other end of the resilient buffering member projects radially inwardly to form a stop ring.

6. The shaft sleeve unit of claim 1, wherein the radial thickness is less than a radial thickness of the buffering member at the remaining area.

7. A motor comprising
a stator;
a rotor comprising a rotary shaft having an output end;
a base body; and
a shaft sleeve unit received in the base body and supporting the rotor for rotation, the shaft sleeve unit comprising a fixing member fixed in the base body, a bearing received in the fixing member and surrounding the rotary shaft, and a resilient buffering member disposed between the fixing member and the bearing; and
wherein the buffering member comprises an inner surface and an outer surface opposite to the inner surface, an annular groove is formed on the inner surface of the buffering member, an outer surface of the bearing is formed with an annular protrusion, the annular protrusion is engaged in the annular groove to connect the bearing with the buffering member, a groove-protrusion structure is formed between the fixing member and the outer surface of the buffering member, the annular groove of the buffering member and the groove-protrusion structure correspond to each other in position, a radial thickness along a radial spacing between the annular groove of the buffering member and the outer surface of the buffering member is less than a radial thickness of the buffering member at the remaining area.

8. The motor of claim 7, wherein one of an outer surface of the fixing member and an inner surface of the base body is formed with a protrusion, the other of the outer surface of the fixing member and the inner surface of the base body is formed with a slot, and the protrusion is engaged in the slot to connect the fixing member to the base body.

9. The motor of claim 7, wherein the groove-protrusion structure comprises an annular protrusion formed on an inner surface of the fixing member, an annular groove formed on the outer surface of the buffering member, the annular protrusion is engaged in the annular groove to connect the fixing member with the buffering member, the annular groove of the inner surface of the buffering member and the annular groove of the outer surface of the buffering member correspond to each other in position.

10. The motor of claim 7, wherein the groove-protrusion structure comprises the outer surface of the buffering member projecting outwardly to form an annular protrusion, an inner surface of the fixing member recessed inwardly to form an annular groove, the annular protrusion of the buffering member is engaged in the annular groove of the fixing member, the annular protrusion of the buffering member and the annular groove of the buffering member correspond to each other in position, a radial distance between the annular protrusion of the buffering member and the annular groove of the buffering member is not greater than a radial distance between the outer surface of the bearing and the inner surface of the fixing member.

11. The motor of claim 7, wherein one end of the buffering member adjacent the output end of the rotary shaft projects radially inwardly to form a stop ring, and the stop ring closely contacts an outer wall surface of the rotary shaft.

12. The motor of claim 7, wherein one end of the buffering member away from the output end of the rotary shaft projects radially outwardly to form a flange, and the flange abuts against an end face of the fixing member.

13. The motor of claim 7, wherein the motor is a single phase permanent magnet motor, the stator of the motor includes a U-shaped magnetic core and windings wound around the magnetic core, the magnetic core is formed with a pair of magnetic poles, the rotor of the motor includes at least one permanent magnet received in the base body and fixed to the rotary shaft, the base body is a hollow cylindrical structure with an open end and a closed end, the output end of the rotary shaft extends out via the open end of the base body, and the shaft sleeve unit is disposed at the open end of the base body.

14. The motor of claim 7, wherein a radial distance between the annular groove of the buffering member and the groove-protrusion structure is not greater than a radial distance between the bearing and the fixing member.

15. A liquid pump comprising:
a motor comprising:
a stator;
a rotor comprising a rotary shaft having an output end;
a base body; and
a shaft sleeve unit received in the base body and supporting the rotor for rotation, the shaft sleeve unit comprising a fixing member fixed in the base body, a bearing received in the fixing member and surrounding the rotary shaft, and a resilient buffering member disposed between the fixing member and the bearing; and an impeller coupled to the output end of the rotor;
wherein an outer surface of the buffering member projects outwardly to form an annular protrusion, an inner surface of the buffering member is recessed inwardly to form an annular groove, an outer surface of the bearing projects outwardly to form an annular protrusion, an inner surface of the fixing member is recessed inwardly to form an annular groove, the annular protrusion of the bearing is engaged in the annular groove of the buffering member, and the annular protrusion of the buffering member is engaged in the annular groove of the fixing member, the annular protrusion and annular groove of the buffering member correspond to each other in position, a radial thickness along a radial spacing between the annular groove of the buffering member and the annular protrusion of the buffering member is less than a radial thickness of the buffering member at the remaining area.

16. The liquid pump of claim 15, wherein a radial distance between the annular groove of the buffering member and the annular protrusion of the buffering member is not greater than a radial distance between the bearing and the fixing member.

* * * * *